United States Patent [19]

Euzen et al.

[11] 4,187,169
[45] Feb. 5, 1980

[54] PROCESS AND APPARATUS FOR EFFECTING THREE-PHASE CATALYTIC REACTIONS

[75] Inventors: Jean-Paul Euzen, Ecully; Daniel Vuillemot, Millery; Claude Dujardin, Chuzelles, all of France

[73] Assignee: Institut Francais du Petrol, Rueil-Malmaison, France

[21] Appl. No.: 885,222

[22] Filed: Mar. 10, 1978

[30] Foreign Application Priority Data

Mar. 10, 1977 [FR] France .............................. 77 07445
Nov. 4, 1977 [FR] France .............................. 77 33492

[51] Int. Cl.$^2$ ...................... C07C 27/22; C10G 13/16; B01J 8/22
[52] U.S. Cl. ...................... 208/157; 208/10; 208/108; 208/112; 260/449 L; 422/213
[58] Field of Search ................ 208/148, 112, 10, 157, 208/164; 23/288 R, 288 DG; 422/213; 260/449

[56] References Cited

U.S. PATENT DOCUMENTS

| 2,521,195 | 9/1950 | Wheeler | 23/284 |
| 2,715,548 | 8/1955 | Fish | 208/164 X |
| 2,985,515 | 5/1961 | McKinley | 23/284 |
| 3,708,420 | 1/1973 | Irvine | 208/156 |
| 4,051,020 | 9/1977 | McDonald | 208/213 |

*Primary Examiner*—Delbert E. Gantz
*Assistant Examiner*—G. E. Schmitkons
*Attorney, Agent, or Firm*—Millen & White

[57] ABSTRACT

Liquid and gas materials are reacted in the presence of a catalyst in a reactor of the dispersed bed type which comprises a plurality of superposed chambers through which the catalyst progressively drops, its rate of transfer from one chamber to another being controlled by injecting an auxiliary fluid into downcomers through which the catalyst is forced to pass.

12 Claims, 7 Drawing Figures

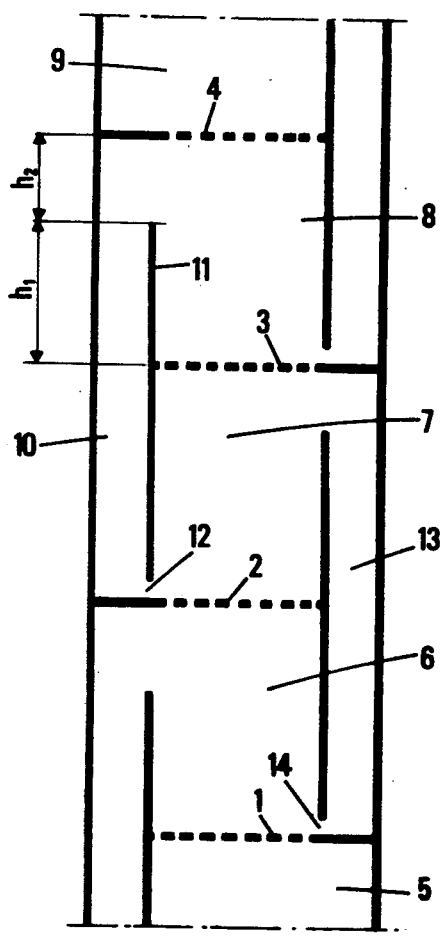
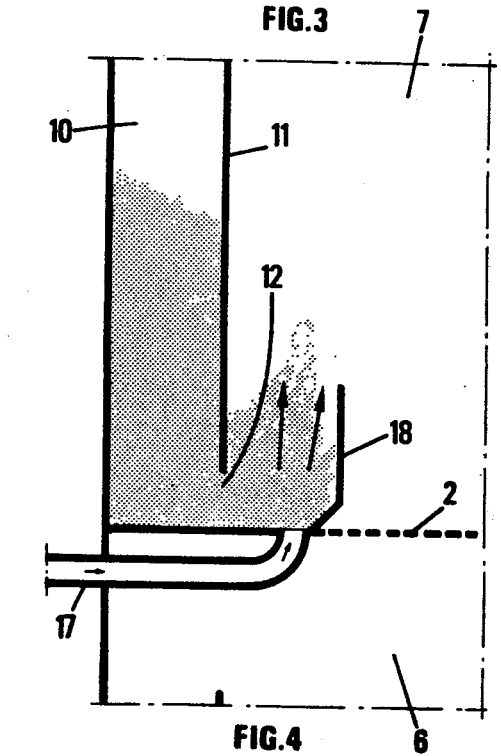
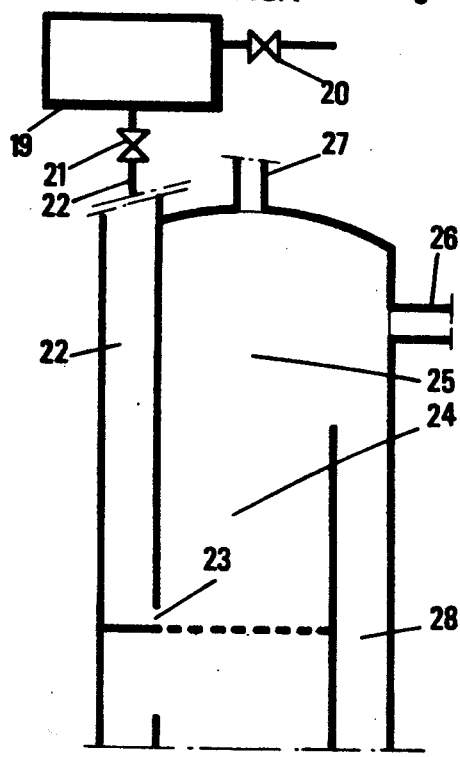
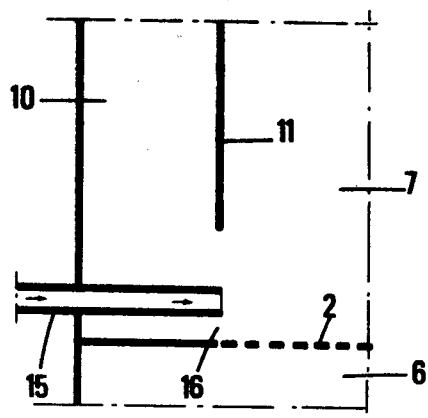

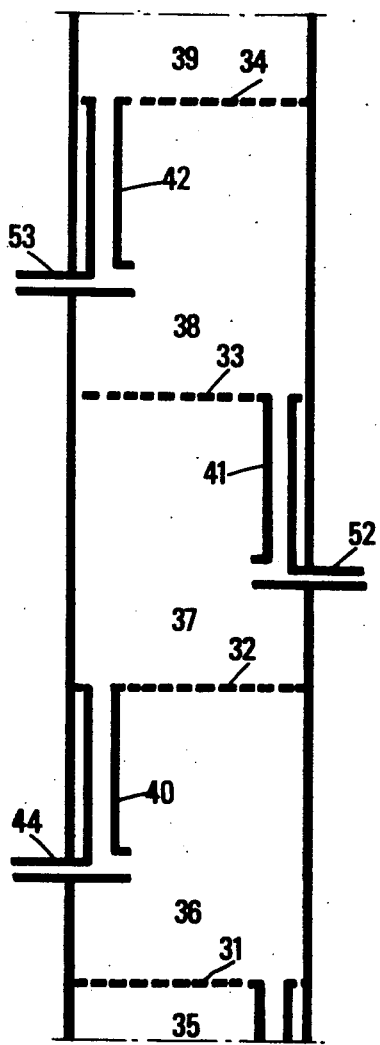
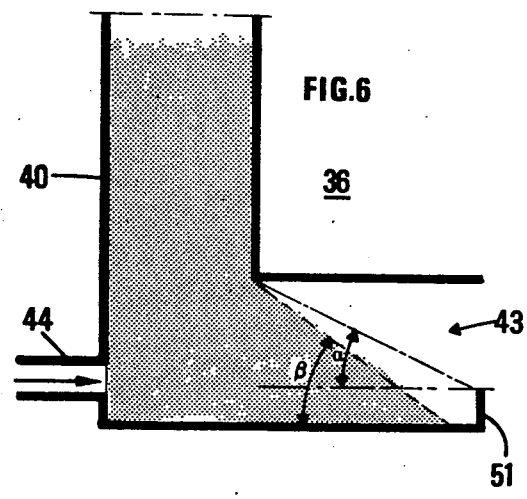
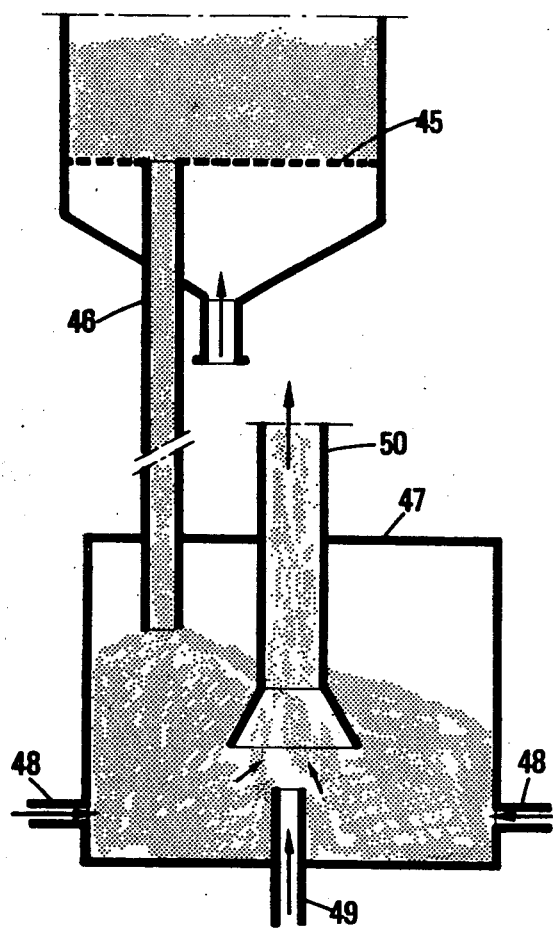

PROCESS AND APPARATUS FOR EFFECTING THREE-PHASE CATALYTIC REACTIONS

BACKGROUND OF THE INVENTION

The invention relates to a process and an apparatus for effecting gas-liquid reactions in the presence of a dispersed catalyst. The invention particularly applies to the catalytic hydroconversion of hydrocarbons and will be described in detail with reference to a preferred embodiment.

According to a known process, heavy hydrocarbon feedstocks are hydrotreated in liquid phase with a dispersed granular catalyst, and particularly with a bed of catalyst in the expanded form, the expansion resulting from the upwards circulation of the liquid hydrocarbon charge and the hydrogen containing gas. An example of this process is known as the H-oil process. In such a process, the catalyst is not quite efficiently used; as a matter of fact, the catalyst discharged from the reactor is a mixture of strongly deactivated catalyst, partially deactivated catalyst and nearly fresh catalyst, and the sorting of the catalyst particles in relation with their deactivation degree is difficult.

According to another embodiment of this technique, a series of superposed beds of the above type may be used. Fresh catalyst is supplied from the top of the reactor and distributed throughout the stages when applying the process. The catalyst is discharged from the lowest stage. This offers the advantage of improving the rate of utilization of the catalyst before its discharge from the process. The main difficulty, in a reactor of this type, lies in the mode of transfer of the catalyst from one stage to another.

According to a first proposition, the catalyst drops continuously throughout the chambers of the apparatus. Such an apparatus cannot be operated easily: the catalyst flows down irregularly; in some cases, plugging of the transfer ducts occurs; in other cases siphoning or fluidization stoppage occur. Relatively efficient running is only obtained at a relatively high drop rate of the catalyst, so that the latter is not well utilized.

According to another proposition, valves are used to control the drop of the catalyst. Valves are not tight when used in the presence of catalyst particles; they deteriorate quickly and their setting up inside the reactor is a real problem, as concerns their control and maintenance, in view of the temperature and pressure conditions and the nature of the reaction medium. Their setting up outside of the reactor obliges to make holes in the wall, which makes it weaker to the high temperatures and pressures. Finally, opening the valves modifies the pressure distribution in the reactor and results in siphoning and even fluidization stopping in the concerned part of the reactor.

BRIEF DESCRIPTION OF THE DRAWINGS

FIGS. 1-7 illustrate apparatus suitable for use in the process of the invention.

DETAILED DISCUSSION

The present invention obviates these disadvantages by providing a process and an apparatus wherein catalyst transfer is largely improved. This transfer may be at will either periodical or continuous. It necessitates no device with mechanical displacement.

The process, according to the invention, of reacting a gas with a liquid in the presence of a dispersed solid catalyst, wherein a mixture of said liquid and said gas is circulated upwardly in general counter-current to the dispersed catalyst throughout a reaction zone comprising a plurality of superposed chambers separated by common walls, each chamber containing a catayst at least partially dispersed in the circulated liquid, each chamber also communicating with the next chamber both through a number of low section openings giving passage to the liquid and the gas, said openings being arranged in the concerned common wall and located on the direct path of the liquid and the gas, and through at least one catalyst transfer duct external to said direct path, the lower portion of the transfer duct forming a relatively quiet zone where the catalyst may accumulate, the liquid and the gas are circulated upwardly throughout the chambers and the low section openings of the corresponding common walls, fresh catalyst is fed at the upper stage of the reaction zone, the catalyst particles move downwardly from one chamber to a lower chamber through said duct external to the direct path of the liquid and the gas, catalyst is discharged from the lower chamber of the reaction zone and the liquid reaction product and the residual gas are discharged from the upper chamber, is so characterized that the rate of flow of the catalyst from a chamber to the immediately lower chamber is controlled by sweeping along the catalyst accumulated at the bottom of a transfer duct towards said immediately lower chamber by means of an adjustable secondary liquid and/or gas stream injected into said transfer duct.

The apparatus conforming to the invention is so characterized that it comprises a substantially vertical elongated enclosure divided into a number of superposed chambers through substantially horizontal common walls comprising relatively narrow holes, all the holes being of sufficient size to permit the upward passage of liquid and gas, each chamber communicating with the immediately lower chamber both through said holes and through at least one relatively wide transfer duct whose lower end is so located as to not directly receive the ascending liquid and gas, said apparatus further comprising means for injecting auxiliary gas or liquid into the transfer duct, these means being so arranged as to sweep along the catalyst towards said immediately lower chamber.

The apparatus is thus remarkable in that it comprises a series of superposed stages or chambers. Each chamber communicates with the next chamber both through common apertures of low unitary section, for example, the free spaces of a grid arranged on the main path of the fluids, and through at least one catalyst transfer duct external to the main path of the fluids, this in such manner that the ascending gas and liquid cannot enter thereinto. According to a first embodiment, the catalyst transfer duct opens on each side of the wall at points relatively remote from said wall, respectively above and below it. According to an alternative embodiment, the upper portion of the duct coincides with the wall, the lower end thereof being remote therefrom.

The perforated walls are preferably horizontal.

Each stage comprises:
a lower zone of contact between the three phases (gas, liquid, catayst) where the catalyst is maintained in suspension in the gas/liquid stream from the lower perforated wall, an upper zone of low catalyst content, through which pass the gas and liquid discharged from the lower zone before passage through the upper perforated wall, an opening for feeding the catalyst at the level of the lower zone, a duct for discharging the catalyst to the immediately lower stage.

Said duct may consist of an overflow pipe whose top delimits the more or less precise border between the two zones, the excess of catalyst dropping continuously through this overflow pipe. This pipe opens at the bottom of the lower stage. This overflow device may however be omitted: in that case, the transfer duct for the catalyst may open at the level of the perforated wall.

An occupation factor characterizes the suspension of catalyst in the lower zone, such as hereinbefore defined. It is the ratio of the volume of the stationary catalyst lying on the grid to the volume of the lower zone of high suspended catalyst content, such as hereinbefore defined. This ratio is usually of from 0.1 to 0.9.

The higher chamber of the apparatus preferably comprises, above the disengaging zone for the catalyst, a relatively still zone for separation of the gas and the liquid with discharge of the so-separated gas and liquid, although the gas may also be separated from the liquid outside of the reactor. The lower chamber of the apparatus also comprises a disengaging zone for the catalyst particles and at least one discharge duct for the latter.

The chambers are separated by walls comprising, on a portion thereof (main path of the charge and the gas), low section openings to permit the upward passage of the liquid and the gas. It is not mandatory that these openings be narrower than the catalyst particles. As a matter of fact, as the free surface of the interstage passage is necessarily smaller than the free section of each chamber below the separation wall, the flow rate of the fluids is higher through the openings than in the remainder of the stage. When selecting a total free passage surface relatively low, the rate of flow is so great as to preclude any direct downward passage of the catalyst through the openings.

According to another embodiment, the openings are not of uniform size or shape, so as to help passing the gas through a number of them and the liquid through others.

The openings may be of any shape, such as circular, rectangular or square holes, elongated openings, grids, etc. Their width may be, for example, 0.1-20 millimeters. Preferred grids are made of steel sections spaced, for example, at a distance from 0.5 to 5 millimeters.

Openings are preferably not provided for in the portion of the wall located below the transfer ducts for the catalyst, which are thus still zones located outside of the main path for the liquid and the gas.

The catalyst particles have usually an equivalent diameter of 0.1 to 10 mm, these values being not mandatory. The equivalent diameter is defined as:

$$d_e = 6 \frac{\text{average volume of a particle}}{\text{average external surface of a particle}}$$

The hydrocarbon charges to be treated according to the invention are hydrocarbons or mixtures of hydrocarbons containing undesired elements of quite diverse nature. In a particularly advantageous embodiment, relatively heavy charges may be treated, such as, for example, crudes or distillation residues containing such impurities as sulfur and/or nitrogen compounds, asphalts, organometal and metal compounds. The reactions are those which may be applied to heavy charges of this type, such as desulfurization, denitrification, hydrocracking, hydrogenation and demetallization.

Another type of reaction is the synthesis of hydrocarbons by reaction of such gases as CO and $H_2$ within a circulated liquid hydrocarbon phase. Another type is the "hydrogenation" or hydrogen treatment of coal of bituminous shales dissolved or dispersed in a circulated hydrocarbon solvent. Another type is the hydrofinishing of used oils to eliminate additives and organometal particles and improve by hydrogenation the lubricating properties and stability to oxidation and temperature.

The reaction conditions are usually a temperature of 270° to 450° C., a pressure of 20 to 300 atmospheres and a hourly space velocity of the liquid charge of 0.1 to 10 volumes per volume of catalyst.

The catalysts are of known type, as used in analogous reactions, for example, group VI and/or VIII metal compounds, used as such or deposited on carriers, such as, for example, alumina, alumina-silica, silica, magnesia, bauxite, red muds, clay, kieselguhr, etc . . .

Examples of metal compounds are the oxides and preferably the sulfides of molybdenum, tungsten, nickel, cobalt, and/or iron. These catalysts are of conventional type and may be prepared in a known manner. The present process may also be effected in several reactors with dispersed catalyst of the type described, these reactors being arranged in series or in parallel. One or more fixed bed reactors may be arranged behind one or more reactors of the dispersed catalyst type as described, these fixed bed reactors being used to complete the reaction or produce a different reaction, for example, hydrosaturation, hydrodesulfurization, hydrodenitrification, hydrocracking, catalytic cracking, hydrorefining or hydrofinishing.

DETAILED DESCRIPTION OF THE DRAWINGS

FIG. 1 is a cross-sectional view of three successive chambers of a reactor. The liquid hydrocarbon charge and hydrogen circulate upwardly in the central portion of the apparatus, while passing through grids 1 to 4 and chambers 5 to 9. At each stage, in each chamber, dispersed catalyst is entrained by the flow of liquid and gas over a height $h_1$ or slightly more. The upper portion of each chamber has an enlarged section over a height $h_2$: a portion of the catalyst may thus escape from chamber 8 and fall in the side-duct 10 limited by the wall of the reactor and the internal wall 11. This side-duct is a still zone: the catalyst particles flow down by gravity and accumulate in the duct. The catalyst accumulated in duct 10 forms a slope at the bottom of the duct, in front of opening 12.

According to the invention, the slope forming catalyst may be entrained, preferably by an independent secondary stream consisting of, for example, reactional or inert gases or liquids, thereby more precisely controlling the catalyst flow through duct 10 towards chamber 7. The higher the flow rate of this secondary stream, the greater the feed rate of catalyst from duct 10 into chamber 7. The flow rate of the secondary fluid may be measured and controlled from the exterior by known means.

FIG. 2 represents an embodiment adapted for introducing this secondary stream, discharged from duct 15, in front of opening 16.

FIG. 3 illustrates another embodiment: a wall 18 retains the slope which is not swept along by the main stream of fluid. A duct 17 is provided for injecting a stream of secondary fluid which sweeps along the catalyst towards chamber 7 as shown by the arrow. The passage of the catalyst from one stage to another is controlled by varying the flow of fluid through duct 17; this flow being continuous or periodical.

FIG. 4 is an example of the upper part of the apparatus: a catalyst container 19 may be put under atmospheric pressure by operating valves 20 and 21. When valve 21 is open, the catalyst drops in duct 22 and passes through opening 23: a secondary stream of liquid or gas, not shown, carries it along towards chamber 24. The flow rate of the liquid decreases in the enlarged zone 25, so that the catalyst is no longer carried along into the latter zone. Liquid practically free of catalyst may thus be discharged through duct 26, and gas through duct 27. If necessary, the liquid/catalyst separation may be completed by passing the liquid in a hydrocyclone or other device.

The catalyst falls progressively into duct 28.

The discharge of the exhausted catalyst from the bottom of the apparatus may be effected easily by passage through the side-duct connected to a tank for the exhausted catalyst. The apparatus, such as hereinbefore described, may be modified without departing from the scope of the invention. The number and position of the ducts for the downward transfer of the catalyst may be modified; the volumes of the chambers may be identical or different.

A preferred embodiment is hereinafter described:

The contacting apparatus comprises a series of superposed chambers separated by walls consisting of perforated plates, grids or any other device for an easy communication between the so-defined compartments. Each wall has at least one duct or "leg" for the catalyst downward flow; it preferably consists of a vertical cylinder whose upper portion joins the perforated wall and the lower bent portion opens in the lower compartment, for example, in a substantially horizontal direction, as shown in FIG. 5.

The reaction feedstock, which consists of a mixture of liquid and gas, passes upwardly through the chambers and the perforated walls. The catalyst in ebullated bed in each chamber may flow down through the legs, according to hereinafter given rules.

Thus each chamber comprises:

a lower zone of contact between the three phases (gas, liquid, catalyst) where the catalyst is maintained in suspension in the gas-liquid stream from the lower grid. This lower zone forms the proper ebullated bed;

an upperzone of low catalyst content through which pass the gas and liquid which have traversed the lower zone, before entering the upper chamber. It is a practically inactive zone, as concerns the reaction;

at least one duct or leg, bent at its lower part, for transferring the catalyst from one chamber to another and so arranged that the catalyst cannot freely drop at the bottom of the duct;

at least one duct for injecting an auxiliary fluid and which opens in the leg, preferably at the lower portion thereof, preferably in the bent portion, and so directed that at least a major part of the auxiliary fluid can flow in the direction of the lower opening of the leg.

Each chamber is characterized by:

a chamber occupation factor which may be the same or different in each chamber: it is the fraction of the chamber volume which is occupied by the ebullated bed. This factor may range from 0.1 to 0.9 and preferably from 0.5 to 0.8;

a bed expansion rate which is the relative increase by volume of the catalyst bed when ebullated with respect to the stationary catalyst bed. This expansion rate does not result from technological considerations or from process considerations, but results from all the hydrodynamical conditions of the flow of the fluids and the solid catalyst. In the considered cases, the expansion rate is from 20 to 70%, often about 50%.

FIG. 5 shows a cross-section of three successive chambers of a reactor operated according to the invention. The reaction liquid and gas circulate upwardly in the apparatus and pass through the grids 31 to 34 and the chambers 35 to 39.

In each chamber, the stream of liquid and gas moves the catalyst, thereby forming an "ebullated bed".

A portion of the catalyst escapes from the main stream of the fluid, accumulates in the downcomers 40, 41 and 42 and is thus available for feeding each lower chamber with catalyst.

The lower portion of the ducts 40, 41 and 42 is so arranged as to practically impede the catalyst to escape freely (thus in the absence of a stream of scavenging fluid introduced through ducts, such as the ducts 44, 52 and 53), the catalyst then forming a slope at the bottom of the ducts. The bent shape at the bottom of these ducts and the presence of accumulated catalyst in the ducts is an obstacle to the upflow passage of the reaction fluids through said legs.

FIG. 6 shows a view of a particular downcomer.

The vertical cylindrical duct 40 is bent at its lower part, so that the accumulated catalyst may form a slope in the elbow. The leg opens through opening 43 into the chamber 36. The plate 51 constitutes an anti-swirl device. As shown in this figure, the elbow may extend with a short horizontal duct. As shown in FIG. 6, in the course of the run, in the absence of a stream of carrying auxiliary fluid, the catalyst accumulates in the leg, thereby forming a slope of average angle $\beta$ to the horizontal. The catalyst cannot freely escape from the leg if the latter has been built with an angle $\alpha < \beta$, where $\alpha$ is the angle between the horizontal and the direction of the upper part of the elbow at the lower opening of the leg, when viewed from said opening.

The downcomer preferably opens in the lower chamber above the ebullated bed and not within same. In that case it opens at an intermediary point (determined in the vertical direction) of the lower chamber, and not at the level of the grid located at the bottom of said lower chamber.

The flow of the catalyst through the opening 43 may be started and controlled by admitting at the lower portion of the elbow, through duct 44, an auxiliary stream of transporting fluid, preferably consisting of a liquid (for example a hydrocarbon cut) previously subjected to the conversion treatment, either in the same apparatus or in an apparatus of different type. An inert liquid of the same nature may be utilized.

The ratio by volume of the auxiliary fluid to be used for laterally transporting the solid catalyst to the fluid treated in the reactor for the same period remains always low, for example, between 0.01:1 and 0.0001:1.

The level of the ebullated bed in each chamber may be detected by known means, such as, for example, a gamma-ray sonde.

The height of the ebullated bed in a chamber may be increased by supplying an auxiliary fluid, either continuously or intermittently, to the downcomer feeding said chamber. The level of the ebullated bed may be made by known means dependent on the inlet flow rate of the auxiliary fluid.

It may be desired to periodically or continuously withdraw a portion of the catalyst from the reaction enclosure to replace it with fresh or regenerated catalyst. The withdrawal of the exhausted catalyst is effected from the lowermost stage. The supply of fresh or regenerated catalyst is effected into the first stage at the top. The withdrawal of the catalyst from the lowermost stage may be effected with a device such as described in FIG. 7.

The lowermost grid 45, whose perforations are smaller than those of the other grids, since it must retain the unstirred catalyst, is provided with a downcomer 46 which traverses the lower wall of the reactor and joins the upper part of the lift pot 47. The catalyst accumulates by gravity in the pot 47. One or more side-ducts 48 permit to inject a first stream of auxiliary fluid, preferably previously treated liquid, which carries along the catalyst into a second stream of auxiliary fluid (main stream) supplied from duct 49 whose axis coincides with that of the lift duct 50 for lifting the catalyst, in order to introduce it into another reaction section,
introduce it into a regeneration section, or
supply it to a tank before discharge from the process.

The length and section of the downcomer 46 must be so calculated that a low stream of auxiliary liquid passing upwardly through the leg from the lift pot suffices to create a pressure drop impeding the passage of the fluids from the reaction enclosure into the lift pot.

In final analysis, the flow rate of the auxiliary fluid fed through the side-ducts 48 controls the withdrawal rate in the reaction enclosure. The withdrawal may be made at will continuous or intermittent.

There has thus been described an improved apparatus for operating a multi-stage ebullated bed.

The arrangement of the transfer ducts in FIGS. 5 and 6, particularly the absence of wall 11 (FIG. 1), offers advantages over the device of FIG. 1:

the heavy particles separate more easily, which makes the preferred discharge of the more deactivated particles easier. This is particularly useful in the demetallization processes;
the discharge, the feeding and the starting of the reactor may be made more complete and rapid;
the levels of the ebullated beds in each chamber may be easily and independently varied, which confers additional flexibility to the process;
the active portion of the catalyst is substantially greater.

The above disclosure concerned the way of transferring the fluids from one chamber to another and the devices for controlling the flow rate of the catalyst through each of the ducts 10. It is however important to coordinate all the individual devices for controlling the flow rate of the secondary fluid, thereby avoiding any lack of balance in the amount of catalyst present in each chamber.

In each chamber, when the plant is operated, the amount of catalyst received from the upper chamber must be the same as the amount of catalyst leaving the chamber. This may be obtained by controlling the level of the decanted catalyst bed in each successive duct, such as 10 or 13, and modifying the flow rate of the secondary fluid to thereby maintain these levels constant. Thus, if the level of the catalyst in duct 13 falls, it is necessary to increase the amount of catalyst fed to chamber 7 to thereby increase the overflowing of catalyst from chamber 7 into duct 13, to compensate for the level drop in duct 13. This is obtained by increasing the flow of catalyst through duct 12, for example, by increasing the flow rate of the secondary fluid fed through duct 15 in FIG. 2 or 17 in FIG. 3. This results in lowering the level of catalyst in duct 10, and thus increasing the amount of catalyst fed to chamber 7. The level of the catalyst is thus progressively adjusted in each duct, from the bottom up to the top. The controls binding the catalyst level in each duct to the flow rate of the secondary fluid at the bottom of the immediately upper duct may be made automatic, in a known manner.

The invention, which has been described by reference to the reactions between hydrocarbons and hydrogen, applies in all cases where a gas and a liquid are reacted in the presence of a dispersed catalyst. Examples of such reactions are:

Various oxidations of a liquid phase with a gas phase in the presence of a solid catalyst, for example, oxidation of acetic acid in solution with an oxygen containing gas, in the presence of an iron oxide or palladium catalyst.

Synthesis starting from compounds in solution, for example butane diol from formaldehyde in aqueous phase and acetylene with copper acetylide solid catalysts, or butane diol from allyl alcohol and a $CO + H_2$ mixture on a rhodium impregnated solid catalyst.

ILLUSTRATIVE EXAMPLE

The process has been successfully operated in a reactor comprising five superposed chambers. A hydrocarbon liquid phase and hydrogen gas are passed upwardly through the reactor while solid catalyst flows down. The latter is in the form of more or less regular balls whose diameter ranges from 1 to 3 mm, with a major proportion from 2 to 2.5 mm. The perforated walls extending horizontally between the chambers comprise circular openings of 3.5 mm diameter, thus larger than the catalyst particles; the perforated surface amounts to about 30% of the total surface. The liquid and gas phases flow at respective superficial rates (ratio of the flow rate by volume to the surface of the section of the reaction zone in the reactor) of 5 cm/sec for the liquid and 1 cm/sec for the gas. In these conditions, the catalyst occupation factor is 0.3. The process, such as hereinbefore described, has permitted to continuously and systematically circulate the catalyst downwardly from one chamber to another at a constant rate of 3.6 liters per hour.

The above apparatus has been used to treat a deasphalted vacuum residue as follows:

$d_4^{15}$: 1.01
freezing point: 38° C.
sulfur: 5.35% b.w.
vanadium: 87 parts per million b.w.
nickel: 34 parts per million b.w.
initial boiling point: 480° C.

in the following conditions:
temperature: 390°–410° C.

hydrogen pressure: 120 atm.

flow rate: 1 liter per liter of reaction space per hour.

The catalyst contains molybdenum-cobalt sulfides on alumina as balls.

The resulting products were: gasoline (yield: 4% b.w.), a gas oil fraction (yield: 16% b.w.) and desulfurized fuel oil (yield: 78% b.w.; sulfur content lower than 1.7% b.w.; nickel: 12 ppm; vanadium: 14 ppm).

What we claim is:

1. A process for reacting a gas with a liquid in the presence of a dispersed solid catalyst, wherein a mixture of said liquid and said gas is circulated upwardly at reaction conditions of said gas with said liquid in general counter-current to the dispersed catalyst throughout a reaction zone comprising a plurality of superposed chambers separated by common walls, each chamber containing a catalyst at least partially dispersed in the circulated liquid, each chamber also communicating with the next upper or lower chamber or both through a number of low section openings giving passage to the liquid and the gas and not to the catalyst under operation conditions, said openings being arranged in the concerned common wall and located on the direct path of the liquid and the gas, and through at least one catalyst transfer duct external to said direct path, the lower portion of the transfer duct forming a relatively quiet zone where the catalyst may accumulate, the liquid and the gas are circulated upwardly in sequence throughout the superposed chambers and the low section openings of the corresponding common walls, fresh catalyst is fed to the upper chamber of the reaction zone, the catalyst particles are moved downwardly from one chamber to a lower chamber through said duct external to the direct path of the liquid and the gas, catalyst is discharged from the lower chamber of the reaction zone and the liquid reaction product and the residual gas are discharged from the upper chamber, so characterized that the rate of flow of the catalyst from a chamber to the immediately lower chamber is controlled by sweeping along the catalyst accumulated at the bottom of a transfer duct towards said immediately lower chamber by means of an adjustable secondary liquid and/or gas stream injected into said transfer duct, said secondary stream of liquid and/or gas being delivered in the vicinity of the opening at the lower portion of the catalyst transfer duct within said lower chamber, in the direction of said opening.

2. A process according to claim 1, wherein the liquid material is a liquid hydrocarbon material and the gas is a hydrogen containing gas.

3. A process according to claim 2, wherein the feed charge also comprises carbon monoxide, thereby producing additional hydrocarbons by synthesis.

4. A process according to claim 2, wherein the feed charge also contains coal, thereby producing additional hydrocarbons by synthesis.

5. A process according to claim 1, wherein the catalyst comprises at least one compound of a metal from the groups VI and/or VIII.

6. A process according to claim 1 wherein the ratio by volume of the fluid forming the secondary stream to the treated fluid is from 0.0001:1 to 0.01:1.

7. A process according to claim 1, wherein the flow rate of the liquid or gas auxiliary stream delivered to a transfer duct (number N) feeding a given chamber with catalyst is controlled in response to the changes of level of the catalyst accumulated in the discharge duct (number N+1) of said chamber, a lowering of said level resulting in an increase of the flow rate of the auxiliary stream injected in said duct (number N) and conversely, the numbers increasing from the top to the bottom.

8. A process according to claim 1, wherein the wall openings have a unitary width of 0.1 to 20 mm.

9. A process according to claim 1, wherein the transfer duct opens on each side of the separation wall at respective points of the concerned chambers relatively remote vertically from said wall.

10. A process according to claim 1, wherein the transfer duct opens at its top at the level of a wall and at its bottom at a distance from said wall.

11. A process according to claim 1, wherein the catalyst is allowed to flow down in the transfer ducts whose lower portion is bent in a substantially horizontal direction, to thereby let the catalyst accumulate in said lower portion and impede the ascending passage of liquid and gas in the transfer ducts.

12. A process according to claim 1, wherein the bent lower portion of the transfer ducts is located at a distance above the lower wall of the chamber fed therewith.

* * * * *